(12) United States Patent
Ravichandran et al.

(10) Patent No.: US 9,043,397 B1
(45) Date of Patent: May 26, 2015

(54) SUGGESTIONS FROM A MESSAGING PLATFORM

(71) Applicant: Twitter, Inc., San Francisco, CA (US)

(72) Inventors: Ram Ravichandran, San Francisco, CA (US); Othman Laraki, San Francisco, CA (US); Florian Leibert, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 159 days.

(21) Appl. No.: 13/633,323

(22) Filed: Oct. 2, 2012

Related U.S. Application Data

(63) Continuation-in-part of application No. 13/214,594, filed on Aug. 22, 2011, now Pat. No. 8,612,529.

(51) Int. Cl.
*G06F 15/173* (2006.01)
*H02J 1/14* (2006.01)

(52) U.S. Cl.
CPC ........................................ *H02J 1/14* (2013.01)

(58) Field of Classification Search
CPC .................................................. G06F 17/3089
USPC ........................................................ 709/204
See application file for complete search history.

(56) References Cited

U.S. PATENT DOCUMENTS

| | | | |
|---|---|---|---|
| 6,965,886 B2 | 11/2005 | Govrin et al. | |
| 7,716,113 B2 | 5/2010 | Crosthwaite et al. | |
| 7,835,974 B2 | 11/2010 | Burgis et al. | |
| 8,600,968 B2 * | 12/2013 | Holenstein et al. | 707/706 |
| 2009/0210806 A1 * | 8/2009 | Dodson et al. | 715/760 |
| 2010/0094878 A1 | 4/2010 | Soroca et al. | |
| 2010/0131441 A1 * | 5/2010 | Gruenhagen et al. | 706/45 |
| 2012/0054869 A1 * | 3/2012 | Yen et al. | 726/24 |
| 2012/0271805 A1 * | 10/2012 | Holenstein et al. | 707/706 |
| 2013/0276112 A1 * | 10/2013 | Dalcher | 726/23 |

* cited by examiner

*Primary Examiner* — Hamza Algibhah

(57) ABSTRACT

A method for providing suggestions from a messaging platform. The method includes: identifying, by a computer processor, a set of website-account pairs, wherein each of the set of website-account pairs represents an account of the messaging platform and a website; for each website-account pair of the set of website-account pairs: selecting, by the computer processor, connected accounts having a graph relationship with the account of the website-account pair, and creating an association between at least a subset of the connected accounts and the website of the website-account pair; receiving a set of websites associated with a user, wherein at least one of the set of websites is referenced by a first association of the created associations; and providing, by the computer processor, one or more account suggestions for the user based at least on the first association.

21 Claims, 11 Drawing Sheets

| Visited Website URL |
|---|
| http://globalpublicsquare.blogs.cnn.com/ |
| http://www.forbes.com/sites/eamonnfingleton/2012/06/04/george-soros-says-the-euro-will-survive/ |
| http://www.forbes.com/sites/brightscope/2012/06/04/jpmorgans-other-messy-problem-mf-globals-missing-money/ |
| http://abcnews.go.com/Entertainment/inside-drew-barrymores-quiet-wedding/ |
| http://www.foxnews.com/sports/2012/06/04/cautious-tsonga-aiming-for-djokovic/ |
| http://aol.sportingnews.com/nba/preview/2012060424/oklahoma-city-thunder--san-antonio-spurs |
| http://www.chicagotribune.com/sports/ |
| http://www.chicagotribune.com/business/#&lid=Business&lpos=Main |
| https://news.google.com/news/section?pz=1&cf=all&ned=us&topic=s |
| http://msn.foxsports.com/nascar/story/Hendrick-dominance-Richard-Petty |
| http://sportsillustrated.cnn.com/2012/mma/boxing/06/04/tapia.memorial.service.ap/index.html |
| http://sportsillustrated.cnn.com/2012/basketball/nba/?eref=sinav |
| http://www.fannation.com/truth_and_rumors/view/330274-how-kobe-helped-hurt-lakers/ |
| http://sportsillustrated.cnn.com/2012/basketball/nba/04/26/2012.playoff.schedule/index.html |
| http://www.forbes.com/sites/nathanvardi/2012/06/04/the-market-is-signaling-the-end-of-vladimir-putin/ |

FIG. 6A

| Visited Website URL |
|---|
| http://globalpublicsquare.blogs.cnn.com/ |
| http://www.forbes.com/sites/ |
| http://www.forbes.com/sites/ |
| http://abcnews.go.com/Entertainment/ |
| http://www.foxnews.com/sports/ |
| http://aol.sportingnews.com/nba/ |
| http://www.chicagotribune.com/sports/ |
| http://www.chicagotribune.com/business/ |
| https://news.google.com/news/ |
| http://msn.foxsports.com/nascar/ |
| http://sportsillustrated.cnn.com/2012/ |
| http://sportsillustrated.cnn.com/basketball/ |
| http://www.fannation.com/truth_and_rumors/ |
| http://sportsillustrated.cnn.com/2012/ |
| http://www.forbes.com/sites/ |

FIG. 6B

| Visited Website URL |
|---|
| http://globalpublicsquare.blogs.cnn.com/ |
| http://www.forbes.com/sites/ |
| http://abcnews.go.com/Entertainment/ |
| http://www.foxnews.com/sports/ |
| http://aol.sportingnews.com/nba/ |
| http://www.chicagotribune.com/sports/ |
| http://www.chicagotribune.com/business/ |
| https://news.google.com/news/ |
| http://msn.foxsports.com/nascar/ |
| http://sportsillustrated.cnn.com/2012/ |
| http://sportsillustrated.cnn.com/basketball/ |
| http://www.fannation.com/truth_and_rumors/ |

FIG. 6C

| Number of Visitors | Visited Website URL |
|---|---|
| 441 | http://globalpublicsquare.blogs.cnn.com/ |
| 757 | http://www.forbes.com/sites/ |
| 80676 | http://abcnews.go.com/Entertainment/ |
| 69419 | http://www.foxnews.com/sports/ |
| 16038 | http://aol.sportingnews.com/nba/ |
| 9757 | http://www.chicagotribune.com/sports/ |
| 1295 | http://www.chicagotribune.com/business/ |
| 12019 | https://news.google.com/news/ |
| 37976 | http://msn.foxsports.com/nascar/ |
| 125138 | http://sportsillustrated.cnn.com/2012/ |
| 62757 | http://sportsillustrated.cnn.com/basketball/ |
| 44095 | http://www.fannation.com/truth_and_rumors/ |

FIG. 6D

| Number of Visitors | Visited Website URL |
|---|---|
| 8441 | http://globalpublicsquare.blogs.cnn.com/ |
| 17757 | http://www.forbes.com/sites/ |
| 10676 | http://abcnews.go.com/Entertainment/ |
| 6419 | http://www.foxnews.com/sports/ |
| 938 | http://aol.sportingnews.com/nba/ |
| 3757 | http://www.chicagotribune.com/sports/ |
| 16295 | http://www.chicagotribune.com/business/ |
| 40019 | https://news.google.com/news/ |
| 976 | http://msn.foxsports.com/nascar/ |
| 6838 | http://sportsillustrated.cnn.com/2012/ |
| 3357 | http://sportsillustrated.cnn.com/basketball/ |
| 501 | http://www.fannation.com/truth_and_rumors/ |

FIG. 6E

SUGGESTIONS FROM A MESSAGING PLATFORM

CROSS-REFERENCE TO RELATED APPLICATIONS

This application is a continuation-in-part of U.S. patent application Ser. No. 13/214,594, entitled: "METHOD AND SYSTEM FOR SUGGESTING MESSAGES AND ACCOUNTS FROM A REAL-TIME MESSAGING PLATFORM" and filed on Aug. 22, 2011. Accordingly, this application claims benefit from U.S. patent application Ser. No. 13/214,594 under 35 U.S.C. §120.

BACKGROUND

Messaging platforms represent relationships between users in a variety of different ways. Users may be connected based on social relationships, business relationships, common interests, and/or engagement on a given issue or topic. For example, a social network may allow a user to identify one or more lists of friends and to communicate publicly or privately among various members of that list. These relationships may be represented as one or more connection graphs connecting users of the messaging platform to other users, entities, or content.

One common characteristic of messaging platforms is that user engagement tends to be higher among users with a larger number of connections in the connection graph. By extension, a new visitor of a messaging platform may be disillusioned by a lack of relevant content and may thus be less likely to activate a new account or to become a regular user. In some cases, growth of a user's connection graph may also be an indication of user engagement. A user with a rapidly growing connection graph may be heavily engaging, finding relevant content, and thus less likely to discontinue use of the service. Conversely, a stagnant connection graph may be an indication that the user is not engaging and not finding relevant content.

Identifying relevant content for users is not a trivial task. In some cases (e.g., for established users), the service has access to a large amount of user-specific data that can be analyzed to identify relevant content. In other cases (e.g., for new users or visitors), user-specific data is limited or unavailable. Thus, the difficulty in suggesting content to a user may depend on the type of messaging platform and the availability of data.

SUMMARY

In general, in one aspect, the invention relates to a method for providing suggestions from a messaging platform. The method includes: identifying, by a computer processor, a set of website-account pairs, wherein each of the set of website-account pairs represents an account of the messaging platform and a website; for each website-account pair of the set of website-account pairs: selecting, by the computer processor, connected accounts having a graph relationship with the account of the website-account pair, and creating an association between at least a subset of the connected accounts and the website of the website-account pair; receiving a set of websites associated with a user, wherein at least one of the set of websites is referenced by a first association of the created associations; and providing, by the computer processor, one or more account suggestions for the user based at least on the first association.

In general, in one aspect, the invention relates to a system for providing suggestions from a messaging platform. The system includes: a computer processor; a data repository storing a set of website-account pairs, wherein each of the set of website-account pairs represents an account of the messaging platform and a website; and a suggestion engine executing on the processor and configured to: access the set of website-account pairs, for each website-account pair of the set of website-account pairs: select connected accounts having a graph relationship with the account of the website-account pair and create an association between at least a subset of the connected accounts and the website of the website-account pair, receive a set of websites associated with a user, wherein at least one of the set of websites is referenced by a first association of the created associations, and provide one or more account suggestions for the user based at least on the first association.

In general, in one aspect, the invention relates to a non-transitory computer readable storage medium including instructions for providing suggestions from a messaging platform. The instructions, when executed by a computer processor, include functionality to: identify a set of website-account pairs, wherein each of the set of website-account pairs represents an account of the messaging platform and a website; for each website-account pair of the set of website-account pairs: select connected accounts having a graph relationship with the account of the website-account pair, and create an association between at least a subset of the connected accounts and the website of the website-account pair; receive a set of websites associated with a user, wherein at least one of the set of websites is referenced by a first association of the created associations; and provide one or more account suggestions for the user based at least on the first association.

Other aspects of the invention will be apparent from the following description and the appended claims.

BRIEF DESCRIPTION OF DRAWINGS

FIGS. 6A-6C show an example of a list of visited websites in accordance with one or more embodiments of the invention.

FIGS. 6D and 6E show exemplary depictions of a verified account's connection counts for a list of visited websites in accordance with one or more embodiments of the invention.

DETAILED DESCRIPTION

Figure 1:
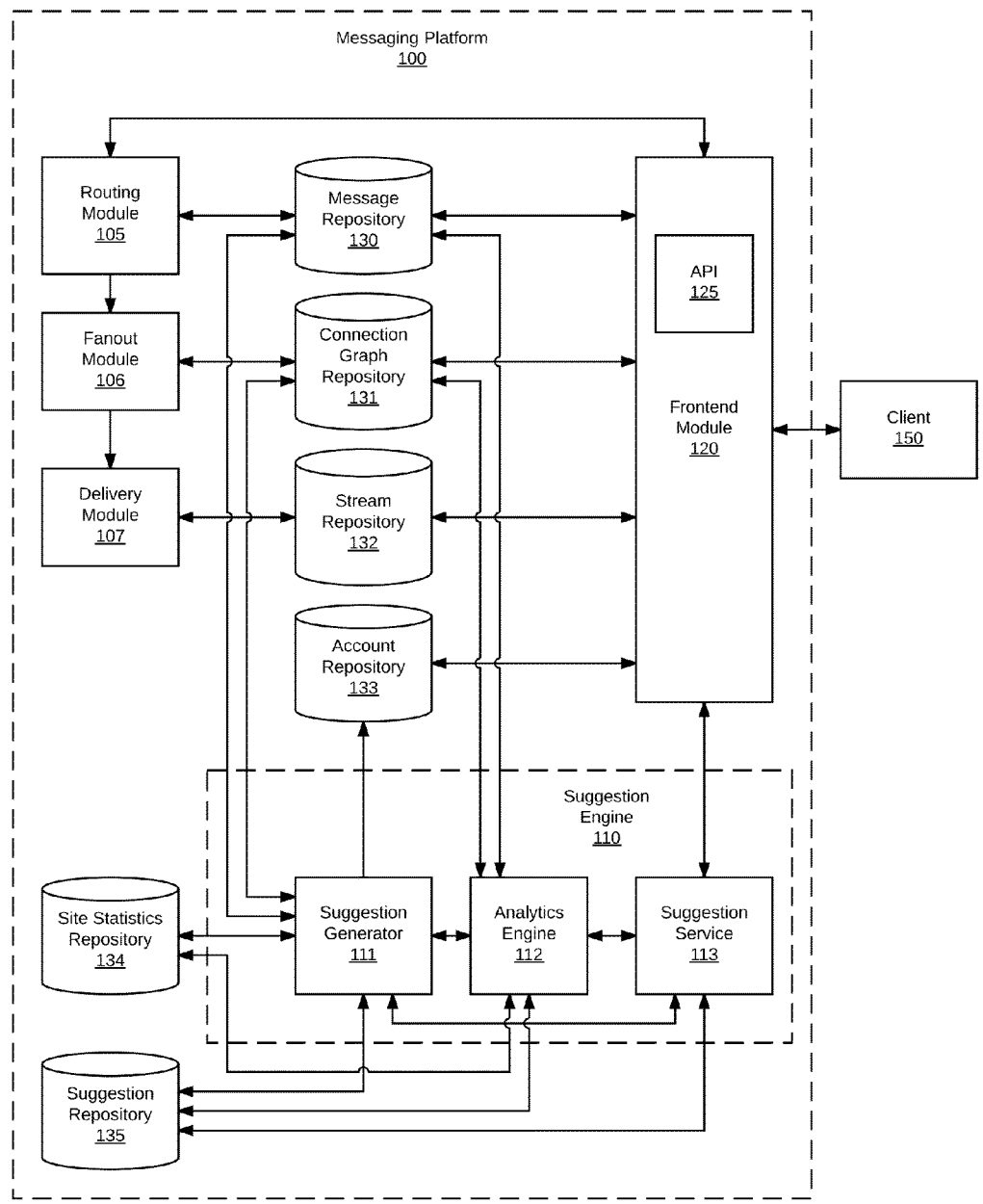
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for providing suggestions to a user of a messaging platform. A set of website-account pairs is identified, with each website-account combination being represented by the pairs. An association is created for each website-account pair. A set of websites associated with the user is identified, where at least one of the websites is referenced by at least one of the created associations. One or more account suggestions are provided for the user based at least on the one association.

FIG. 1 shows a system in accordance with one or more embodiments of the invention. As shown in FIG. 1, the system has multiple components including a messaging platform (100), a routing module (105), a fanout module (106), a delivery module (107), a suggestion engine (110), a suggestion generator (111), an analytics engine (112), a suggestion service (113), a frontend module (120), an application programming interface (API) (125), one or more data repositories (e.g., message repository (130), connection graph repository (131), stream repository (132), account repository (133), site statistics repository (134), suggestion repository (135)), and one or more clients (e.g., client (150)). Various components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), a wide area network (WAN), the Internet, etc.), with wired and/or wireless segments. Those skilled in the art will appreciate that there may be more than one of each separate component running on a device, as well as any combination of these components within a given embodiment of the invention.

In one or more embodiments of the invention, the suggestion service (113) includes functionality to receive a request for suggested accounts. The request may include a set of visited websites, context data, account attribute data (e.g., an identifier of a user's account, an identifier of a requester's account, etc.), user attribute data (e.g., internet protocol (IP) address, geographic location of the user, demographic data, user behavior data, etc.), and/or any other data usable in suggesting accounts to the user. The suggestion service (113) may be configured to receive the request from the frontend module (120) in communication with a client computing device (e.g., client (150)). The suggestion service (113) may be configured to provide a set of suggested accounts to the frontend module (120) in response to the request. The frontend module (120) may then provide the suggested accounts to the client (150). The client (150) may be any computing device capable of requesting suggested accounts. The requesting entity may be a user of the device, or a third party (e.g., a website accessed by a web browser of the client (150)), in accordance with various embodiments of the invention.

Figure 2:
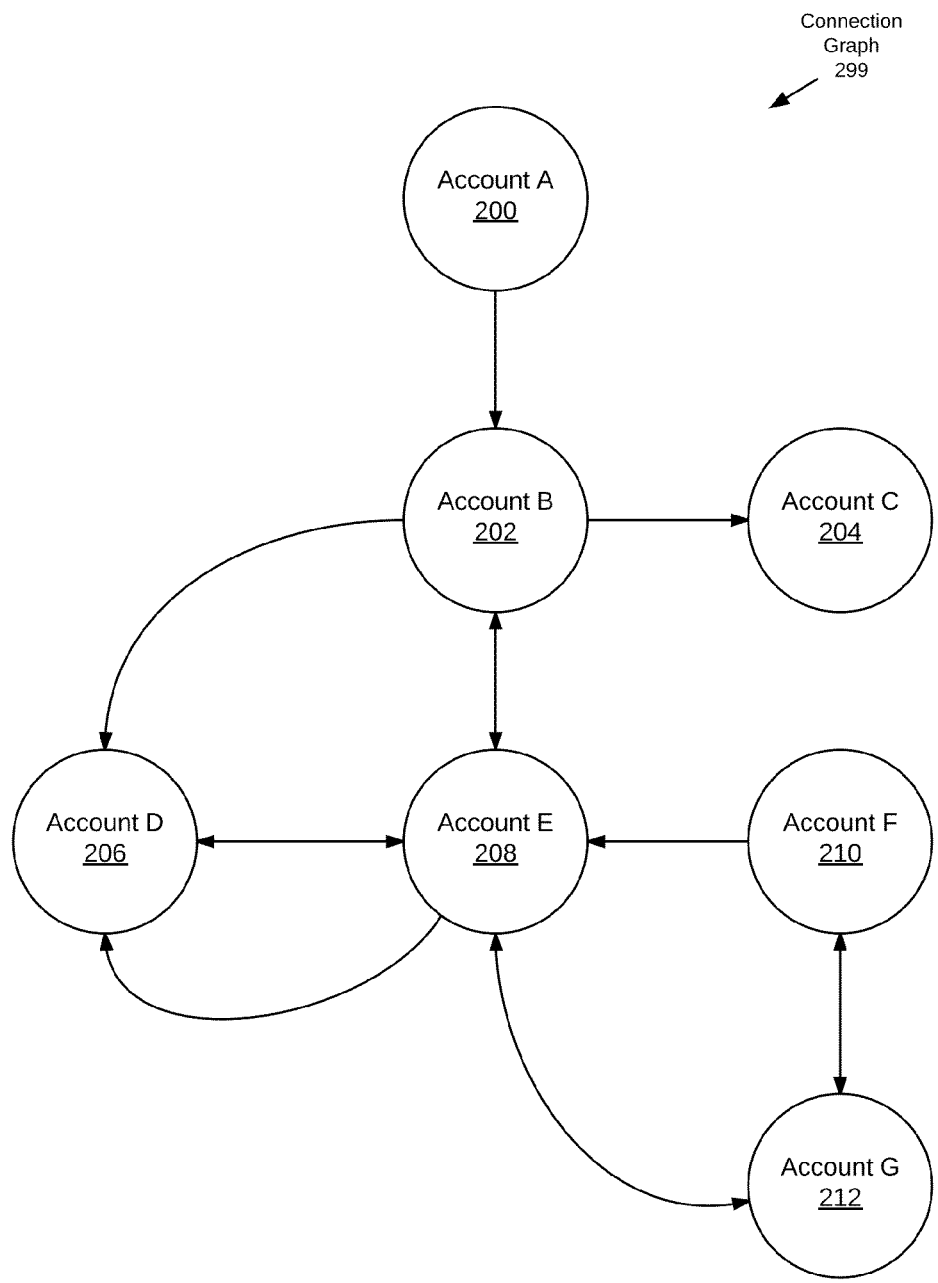
FIG. 2 shows a depiction of an example connection graph in accordance with one or more embodiments of the invention.

In one or more embodiments of the invention, the messaging platform (100) includes an connection graph. FIG. 2 shows an example depiction of a connection graph (299) in accordance with one or more embodiments of the invention. As shown in FIG. 2, the connection graph (299) has multiple components including a set of accounts (i.e., Account A (200), Account B (202), Account C (204), Account D (206), Account E (208), Account F (210), Account G (212)) and a set of edges connecting the accounts. Various components of the connection graph (299) may be located on the same device (e.g., a server, mainframe, or any other device) or may be located on separate devices connected by a network (e.g., a local area network (LAN), a wide area network (WAN), the Internet, etc.), with wired and/or wireless segments. Those skilled in the art will appreciate that there may be more than one of each component of the connection graph (299) stored on a device, as well as any combination of the components within a given embodiment of the invention.

The connection graph (299) is a data structure representing relationships (i.e., connections) between one or more accounts. The connection graph (299) represents accounts as nodes and relationships as edges connecting one or more nodes. A relationship may refer to any association between the accounts (e.g., following, friending, subscribing, tracking, liking, tagging, and/or etc.). The edges of the connection graph (299) may be directed and/or undirected based on the type of relationship, in accordance with various embodiments of the invention.

Returning to FIG. 1, in one or more embodiments of the invention, the suggestion generator (111) includes functionality to identify a set of websites visited by a user. The identified websites may be represented as a reference to a specific web page and/or a reference to a base address. Thus, in one example, if a user visits multiple different pages of a website having the same base address (e.g., http://en.wikipedia.org/wiki/Object-oriented_programming, http://en.wikipedia.org/wiki/Data_abstraction, http://en.wikipedia.org/wiki/Computer_science), only the base address is represented in the set of visited websites. Alternatively, in another example, each reference may be a unique identifier of a web page and/or any other Internet accessible resource. References may be stored in any format. Examples of reference formats may include, but are not limited to, uniform resource locator (URL) format, uniform resource identifier (URI), uniform resource name (URN) format, and/other any other format for identifying one or more Internet accessible resources.

In one or more embodiments of the invention, the suggestion generator (111) includes functionality to generate a set of website-account pairs. The set of website-account pairs may identify every unique combination of websites from the set of websites with accounts from an identified set of accounts of the messaging platform (100) (e.g., whitelisted accounts), or any subset thereof. The set of website-account pairs may be any data structure identifying the various combinations and may be implemented using references and/or identifiers of the accounts and websites, in accordance with various embodiments of the invention. Thus, for example, for a whitelist including 5,000 verified accounts and a set of 20 visited websites, the suggestion generator (111) may produce 100,000 website-account pairs.

In one or more embodiments of the invention, the suggestion generator (111) includes functionality to a calculate connection score for one or more website-account pairs. For example, the connection score may be calculated based on a mathematical formula of the number of visitors to the web site among followers of the account:

$$\text{ConnectionScore}(W, A_{ID}) = |W_{visitors} \cap A_{IDconnections}| \quad \text{(equation 1)}$$

where $(W, A_{ID})$ is the website-account pair, $W_{visitors}$ is the set of all visitors to the website, and $A_{IDconnections}$ is the set of connections of the verified account. Different variations of equation 1 may be used, in accordance with various embodiments of the invention. For example, a root (e.g., square root), a power (e.g., squared), and/or a constant multiple of equation 1 may be used.

In one example, equation 1 may be modified to consider a density of the visitors to the website among followers of the account:

$$ConnectionScore(W, A_{ID}) = \frac{|W_{visitors} \cap A_{IDconnections}|}{|A_{IDconnections}|} \quad \text{(equation 2)}$$

In one or more embodiments of the invention, variants of equation 1 include one or more additional terms. The additional terms may include context data, graph data, account attribute data, and/or user attribute data. For example, the suggestion generator (111) may calculate connection scores based on the following formula:

$$ConnectionScore(W, A_{ID}) = \quad \text{(equation 3)}$$
$$|W_{visitors} \cap A_{IDconnections}| * \frac{P_{(W,A_{ID})}}{A_{ID-R}}$$

where $P_{(W,AID)}$ is a content access statistic (e.g., average number of page views per follower) for the website account pair, and $A_{ID-R}$ is a numerical recognition score of the account.

In another example, the suggestion generator (111) may modify equation 1 to provide higher relevance to accounts with a lower number of connections:

$$ConnectionScore(W, A_{ID}) = \quad \text{(equation 4)}$$
$$|W_{visitors} \cap A_{IDconnections}| * \frac{\log(T)}{|A_{IDconnections}|}$$

where T is the total number of accounts in the messaging platform (100). Any other variation of term frequency inverse weighting may be used, in accordance with various embodiments of the invention.

In one or more embodiments of the invention, the mathematical function includes a normalizing constant. For example, the suggestion generator (111) may be configured to calculate connection scores based on the following formula:

$$ConnectionScore(W, A_{ID}) = \frac{|W_{visitors} \cap A_{IDconnections}|}{\sum_{a \in A} |W_{visitors} \cap a_{connections}|} \quad \text{(equation 5)}$$

In this formula, the normalizing constant is $$\frac{1}{\sum_{a \in A} |W_{visitors} \cap a_{connections}|},$$

where A is the set of verified accounts from a whitelist of verified accounts and $W_{visitors}$ is the set of all visitors to the website. In one or more embodiments of the invention, the terms $A_{IDconnections}$ and $a_{connections}$ may be substituted with $A_{IDfollowers}$ and $a_{followers}$, respectively. Thus, the suggestion generator (111) may be configured to use follower and followee relationships in the calculation of connection scores where applicable.

In one or more embodiments of the invention, the suggestion generator (111) includes functionality to filter the list of visited websites. The suggestion generator (111) may truncate one or more of the entries in the list of visited websites to remove personal or identifying information of the user or client computing device (150). The suggestion generator (111) may be configured to truncate a string (e.g., a URL) identifying the one or more websites in order to consolidate multiple entries into a single entry in the list. For example, the suggestion generator (111) may truncate URLs in the list of visited websites to include only base URLs (e.g., by truncating sections of the path, ports, subdomains, etc.). In this example, the result of the truncation leaves multiple duplicate entries in the list of visited websites. The suggestion generator (111) may be configured to consolidate the duplicate entries or to maintain the duplicates in order to weight multiple visits more heavily in suggesting accounts. Thus, for example, the suggestion generator (111) may be configured to multiply a connection score of each duplicate by a function of the number of duplications in order to increase the relevance of repeated entries in the list.

In one or more embodiments of the invention, the suggestion generator (111) includes functionality to truncate a portion of the path of each entry in the list of visited websites. Thus, the suggestion generator (111) may be configured to represent the visited websites using varying levels of granularity according to one or more predefined settings. For example, the suggestion generator (111) may be configured to truncate the path beyond a preconfigured number of levels (N). Thus, in this example, given a value of N=1, the URL "http://en.wikipedia.org/wiki/URI_scheme#Examples" is truncated to "http://en.wikipedia.org/wiki/". Continuing the example, changing the number of levels to N=0 produces the URL "http://en.wikipedia.org/".

In one or more embodiments of the invention, the suggestion generator (111) includes functionality to access a whitelist of verified accounts. The suggestion generator (111) may be configured to define one or more filtering criteria for verifying accounts for inclusion in the whitelist. The suggestion generator (111) may be configured to identify accounts satisfying the filtering criteria. In one or more embodiments of the invention, the suggestion generator (111) includes functionality to define a priority list of filtering criteria. Each filtering criterion may include any number of the following requirements, or any combination thereof:

1) minimum number of connections/followers/followees
2) minimum number of core connections/followers/followees
3) minimum number of posted messages
4) minimum number of received messages
5) minimum average number of days between logins
6) predefined minimum age
7) minimum profile completion percentage
8) minimum number of logins during a predefined time period
9) maximum number of followees The suggestion generator (111) may be configured to apply one or more of the filtering criteria in the priority list (according to their order in the list) to accounts in the account repository (133) until the result set falls below a threshold number of accounts. In a first example, the suggestion generator (111) obtains a result set of 200,000 accounts after applying a first filtering criterion. In this example, the threshold number of accounts is 16,000. Continuing the example, the suggestion generator (111) applies a second filtering criterion to the result set and a modified result set of 25,000 accounts is obtained. Lastly, the suggestion generator (111) applies a third criterion in the priority list to the modified result set. As a result, a final result set of 10,000 verified accounts is identified. The suggestion generator (111) then determines that the result set satisfies the threshold number of accounts (i.e., 10,000<16,000). Continuing the example, based on the threshold being satisfied, the suggestion generator (111) populates a whitelist with the 10,000 verified accounts from the final result set.

The suggestion generator (111) may be configured to modify the set of website-account pairs (e.g., by removing duplicates) and then calculate connection scores for one or more of the pairs. In one example, the following is a whitelist of 6 verified accounts:

| Verified Accounts |
|---|
| 1223 |
| 1444 |
| 1226 |
| 6355 |

In this example, the whitelist contains only a numerical identifier of each account. Continuing the example, the following is an example set of visited websites:

| Visited Websites |
|---|
| http://www.cnn.com/ |
| https://www.twitter.com/ |
| https://www.si.com/ |
| http://www.reddit.com/ |
| http://www.google.com/ |
| http://www.squareup.com/ |

In this example, the suggestion generator (111) generates the following list of website-account pairs:

| Website-Account Pairs |
|---|
| { http://www.cnn.com/, 1223} |
| { https://www.twitter.com/, 1223} |
| { https://www.si.com/, 1223} |
| { http://www.reddit.com/, 1223} |
| { http://www.google.com/, 1223} |
| { http://www.squareup.com/, 1223} |
| { http://www.cnn.com/, 1444} |
| { https://www.twitter.com/, 1444} |
| { https://www.si.com/, 1444} |
| { http://www.reddit.com/, 1444} |
| { http://www.google.com/, 1444} |
| { http://www.squareup.com/, 1444} |
| { http://www.cnn.com/, 1226} |
| { https://www.twitter.com/, 1226} |
| { https://www.si.com/, 1226} |
| { http://www.reddit.com/, 1226} |
| { http://www.google.com/, 1226} |
| { http://www.squareup.com/, 1226} |
| { http://www.cnn.com/, 6355} |
| { http://www.twitter.com/, 6355} |
| { https://www.si.com/, 6355} |
| { http://www.reddit.com/, 6355} |
| { http://www.google.com/, 6355} |
| { http://www.squareup.com/, 6355} |

In one or more embodiments of the invention, the suggestion generator (111) includes functionality to identify one or more attributes of a verified account. An attribute may be any data associated with the account which is used, either directly or indirectly, in determining whether or not to suggest the account to a user. Examples of an attribute may include, but are not limited to, a demographic profile of followers/followees/connections of the account, a category of the account (e.g., business, entertainment, technology, author, athlete, journalism, etc.), a descriptive keyword, a numerical recognition score (e.g., calculated based on a number of mentions by other accounts, calculated based on a number of connections of the account, calculated based on a quantity of website traffic, entered by an administrator, obtained from a third party, etc.), follower/followee/connection engagement rate (e.g., number of monthly logins, number of monthly messages, average number of followers, etc.), and any other information used in determining whether or not to suggest the account. The numerical recognition score may be any number indicating recognizability of the account (e.g., by the average user).

In one or more embodiments of the invention, the suggestion generator (111) includes functionality to identify connections of one or more verified accounts. The suggestion generator (111) may be configured to identify connections by identifying a number of relationships of each verified account. In one or more embodiments of the invention, the suggestion generator (111) is configured to identify followers and/or followees of each of the verified accounts for use in equations 1-5 (discussed above), or a variant thereof.

In one or more embodiments of the invention, the suggestion generator (111) includes functionality to identify a set of core connections (e.g., core followers, core followees, etc.) of each verified account. In one or more embodiments of the invention, only core connections are used to calculate connection scores. Thus, for example, $A_{IDconnections}$ and $a_{connections}$ of equations 1-5 (above) may consist of only core connections (i.e., excluding non-core connections or followers).

The suggestion generator (111) may be configured to receive, identify, and/or modify one or more filtering criteria for identifying core connections. The filtering criteria for identifying core connections (similar to the filtering criteria for verifying accounts, above) may include, but are not limited to:

1) minimum number of followers
 2) maximum number of followees
 3) minimum number of connections
 4) minimum number of posted messages
 5) minimum number of received messages
 6) minimum average number of days between logins
 7) predefined minimum age
 8) minimum profile completion percentage (e.g., percentage of completed fields of the account's profile)
 9) minimum number of logins during a predefined time period The suggestion generator (111) may be configured to apply any number of the above filtering criteria (or any combination thereof) to accounts in the account repository (133) in order to identify one or more core connections. In one or more embodiments of the invention, the suggestion generator (111) is configured to store an ordered list of one or more filtering criteria for identifying core connections. The suggestion generator (111) may apply these criteria in their sequential order in order to produce a result set of a minimum predetermined size. In one example, the suggestion generator (111) identifies a requested minimum result set size of 10 accounts. In this example, the suggestion generator (111) applies 4 filtering criteria from the ordered list in order to produce 20 results. The suggestion generator (111) determines that adding the next filtering criterion in the ordered list reduces the result set to 8 (i.e., less than the minimum of 10). Based on this determination, the suggestion generator (111) removes the last applied filtering criterion and selects the original 20 results as core connections.

In one or more embodiments of the invention, the suggestion generator (111) includes functionality to identify, for each verified account, a number of the connections (e.g., the identified core connections) who visited each website of the set of visited websites. In other words, the suggestion generator (111) may (1) select a website-account pair, (2) identify core connections (e.g., followers) of the corresponding account, and (3) calculate a count of the core connections which have visited the website. The suggestion generator (111) may be configured to repeat these steps for each of the website-account pairs, in sequential and/or parallel order.

In one or more embodiments of the invention, the suggestion generator (111) includes functionality to identify user attribute data associated with the user who visited the set of visited websites. User attribute data may include, but is not limited to, an internet protocol (IP) address of a user's computing device, a geographic location of the user, demographic data of the user, and/or user behavior data (e.g., average time per session).

In one or more embodiments of the invention, the suggestion generator (111) includes functionality to identify account attribute data associated with the user who visited the set of visited websites. Account attribute data may include, but is not limited to, account data associated with an account of the user in the messaging platform (100). Thus, the suggestion generator (111) may be configured to determine that the user is already a member of the messaging platform (100) and/or to identify one or more suggested accounts for the user based on attributes of the user's account. For example, the suggestion generator (111) may match an attribute of the user's account with one or more attributes of other accounts. In this example, based on the match, the suggestion generator (111) may increase a connection score of the matched accounts.

In one or more embodiments of the invention, the suggestion generator (111) includes functionality to identify context data associated with the request for suggested accounts. Context data may include one or more of a predefined set of request types. Examples of a request type may include, but are not limited to, visitor request, member request, third party visitor request (i.e., a third party is requesting suggested accounts for a non-registered or non-logged in user), third party member request (i.e., a third party is requesting suggested accounts for a registered user), mobile application visitor request, mobile application member request, and/or any other type of request. Context data may further include identifying information of a requesting entity, usage information (e.g., type of user interface (UI) for displaying the suggested accounts, etc.), information identifying characteristics of the requesting entity, information identifying characteristics of users of the requesting entity (e.g., user demographic information provided by a website, etc.), and/or any other contextual information related to the request.

The requesting entity may be a software application (e.g., a web application, a client application, a mobile application, etc.) accessing or involved in obtaining the suggested accounts. In one example, the requesting entity is a web application serving content to a web browser of a user's client computing device. In this example, although the frontend module (120) receives the request directly from the web browser, the web application initiates an application programming interface (API) call requesting the suggested accounts. Thus, in this example, the web application is a requesting entity although the API call is made from the user's web browser. In another example, the frontend module (120) receives a third party visitor request from a mobile application executing on a user's smartphone. In this example, the user is not a member of the messaging platform. The request also includes demographic information regarding users of the mobile application. Specifically, the request includes an age range, average annual income, and gender distribution. The request in this example is an API call made by the mobile application to the messaging platform. The suggestion generator (111) uses the context information to generate a set of suggested accounts for a user of the mobile application.

In one or more embodiments of the invention, the suggestion generator (111) includes functionality to define one or more rules for suggesting one or more accounts. A rule may be any minimum requirement for considering the account for suggestion. Examples of a rule for suggesting an account may include, but are not limited to, a minimum number of core connections/followers/followees who visited a given site in the set of visited websites during a predefined time period, a requirement that one or more attributes of the verified account are matched to context data included in the request (e.g., a predefined category match), a requirement that one or more attributes of the verified account are matched to user attribute data included in the request (e.g., a demographic match), a requirement that one or more attributes of the verified account are matched to account attribute data (e.g., an attribute of the user's account) identified based on the request and/or any other requirement or precondition for suggesting the account.

In one or more embodiments of the invention, the suggestion generator (111) includes functionality to use the connection scores, context data, graph data, account attribute data, user attribute data, the set of visited websites, and/or one or more predefined rules to identify accounts for suggestion to a user. The suggestion generator (111) may use the context data, graph data, account attribute data, user attribute data, and/or the predefined rules to narrow the list of eligible verified accounts either prior to or after calculation of the connection scores, in accordance with various embodiments of the invention. In one or more embodiments of the invention, the mathematical formula used by the suggestion generator (111) to calculate the connection scores may include one or more terms representing context data, graph data, account attribute data, user attribute data, and/or predefined rules. Identifiers of the accounts which are selected for suggestion may then be sent to a client computing device of the user (e.g., in response to an API call). For example, a request for suggested accounts may include context data indicating that the request is for a visitor (i.e., a non-member). In this example, the suggestion generator (111) calculates a numerical recognition score for each of the verified accounts in a whitelist. The suggestion generator (111) then multiplies the connection scores of each website-account pair by the numerical recognition score of the corresponding account. Continuing the example, the suggestion service (113) receives a second request including context data indicating that the suggested accounts are for an existing member. Based on the suggestions being for an existing member, the suggestion generator (111) calculates connection scores multiplied by an inverse of the numerical recognition scores of each account in the website-account pairs. Thus, in this example, recognizability is weighted more heavily by the suggestion generator (111) for visitors than existing members. The logic is, in this example, that existing members may be more likely to already be aware of the most recognizable accounts.

In one or more embodiments of the invention, the suggestion generator (111) includes functionality to consolidate the connection scores for each of the verified accounts. Thus, the suggestion generator (111) may be configured to calculate a summation of all connection scores for a given account (i.e., to add all connection scores for website-account pairs having the same account). The suggestion generator (111) may use this as a final connection score for the account and may select the accounts with the highest final connection score for suggestion to the user. Alternatively, the suggestion generator (111) may make any number of adjustments to the connection score(s) before and/or after consolidating the connection scores, in accordance with various embodiments of the invention.

In one or more embodiments of the invention, the suggestion generator (111) and suggestion service (113) are software applications or a set of related software applications configured to execute on one or more hardware processors. The suggestion generator (111) may include a background process (e.g., a daemon) or a series of background processes configured to perform one or more of the above described functions. The suggestion service (113) may be a service component of a service-oriented architecture (SOA) application and may be configured to facilitate communication between the suggestion generator (111) and one or more other components of the messaging platform (100). In one or more embodiments of the invention, one or more components of the suggestion engine (110) reside in a cloud computing application in a network distributed system. In one or more embodiments of the invention, the suggestion engine (110) is integrated within or operatively connected to one or more other components of the messaging platform (100).

In one or more embodiments of the invention, the analytics engine (112) includes functionality to provide message passing functionality utilizing one or more features of the disclosed invention to an experimental group of users. For example, the analytics engine (112) may be configured to provide tailored account suggestions based on a history of visited websites to each user in the experimental group. In one or more embodiments of the invention, the message analytics engine (112) includes functionality to exclude one or more features of the disclosed invention from a control group of users. For example, the control group may be given a predefined list of account suggestions (i.e., not based on a history of visited websites).

In one or more embodiments of the invention, the analytics engine (112) includes functionality to obtain user engagement data for the selected control and experimental groups. User engagement data may be any data identifying user behavior with respect to one or more predefined metrics. Examples of user engagement data may include, but are not limited to, retention rate over a predefined time period, average number of logins in a predefined time period, percentage of new account activations for users accessing a website or web page, percentage of users selecting a displayed user interface element (e.g., an advertisement), average length of time per user visit, average number of sent/received messages per time period, average number of new connections per time period, percentage change in new connections (e.g., followers, followees, or general connections) per time period, follow-through rate with respect to a series of account activation screens, percentage of account cancellations within a predefined time period, and/or any other objective data identifying user interaction.

In one or more embodiments of the invention, the analytics engine (112) includes functionality to identify user engagement data for differing categories of users. For example, user engagement data may be categorized based on user demographics, location (based on internet protocol (IP) address), attributes, and/or behavior.

In one or more embodiments of the invention, the analytics engine (112) includes functionality to perform a statistical analysis of the engagement data in the control and experimental groups. The analytics engine (112) may normalize the user engagement data in order to generate one or more comparisons between the two groups. Any method of isolating and/or mitigating statistical error may be used, in accordance with various embodiments of the invention.

In one or more embodiments of the invention, the analytics engine (112) includes functionality to identify statistically significant differences between various control and experimental groups. The analytics engine (112) may be configured to output the differences in a report or to notify a predefined list of entities when the difference(s) exceeds a predefined threshold. The analytics engine (112) may also be configured to remove one or more filtering criteria for including accounts in the whitelist of verified accounts, one or more filtering criteria for identifying core connections, and/or one or more rules for suggesting a verified account based on the difference exceeding the predefined threshold. For example, the analytics engine (112) may perform a comparison between an experimental group and a control group in which the experimental group has 1 additional filtering criterion for including accounts in the whitelist. In this example, the filtering criterion requires that the account be at least 3 years old in order to be included in the whitelist as a verified account. Continuing the example, the analytics engine (112) determines that the differences in the new user registration follow-through rate and the next day retention rate less than a predefined threshold of 0.5%. As a result, the analytics engine (112) removes the filtering criterion. In another example, the analytics engine (112) normalizes the connection scores based on standard deviation. In this example, the analytics engine (112) then performs a comparison of two or more normalized data sets in order to identify differences in user engagement across one or more user attributes (e.g., demographic attributes, geographic location, user behavior, etc.).

In one or more embodiments of the invention, the suggestion repository (135) includes functionality to store data used and/or generated by the suggestion engine (111), the analytics engine (112), and/or the suggestion service (113). For example, the suggestion repository (135) may be configured to store one or more account suggestions, website-account pairs, connection scores, whitelists, filtering criteria, context data, rules for suggesting accounts, control/experimental/engagement data used by the analytics engine (112), and/or any other data required in the performing the functionality of the aforementioned components of the system of FIG. 1. In one or more embodiments of the invention, the suggestion service (113) is configured to respond to requests for account suggestions by identifying one or more sets of account suggestions which are precalculated (e.g., by the suggestion generator (111)) and stored in the suggestion repository (135). Thus, in certain embodiments, an on-demand calculation of account suggestions may not be necessary.

In one or more embodiments of the invention, the site statistics repository (134) includes functionality to store data used and/or generated by the suggestion engine (111), the analytics engine (112), and/or the suggestion service (113). For example, the site statistics repository (134) may be configured to store a set of one or more connections who visited one or more websites, access statistics on visitors to the website(s), website specific analytics data calculated and/or used by the analytics engine (112), and/or any other website specific data required in the performing the functionality of the aforementioned components of the system of FIG. 1.

In one or more embodiments of the invention, the messaging platform (100) includes functionality to create an account for a user. The messaging platform (100) may associate the account with one or more other accounts in response to user input obtained from a client computing device (150). Associating the account may involve following, friending, subscribing, tracking, liking, tagging, and/or establishing any other form of unidirectional or bidirectional association between the two accounts. Accounts accessed by the messaging platform (100) may be native accounts created by the messaging platform (100) and/or third party accounts created by one or more external applications. In the case of third party accounts, the messaging platform (100) may be configured to obtain credentials for the account from the user and/or access the account through a third party application programming interface (API). In one or more embodiments of the invention, the messaging platform (100) is configured to allow creation of multiple accounts per user. For example, users may utilize multiple accounts to maintain varying levels of anonymity/privacy, to create one or more aliases, to categorize friends, and etc.

Accounts of the messaging platform (100) may correspond to a person (e.g., the user), an entity (e.g., a musical group, a business, a common interest group of other users, etc.), a group of people, a group of entities, and/or any combination thereof. In one or more embodiments of the invention, one or more users is a representative of an entity having an account with the messaging platform (100). For example, a user may be an employee of a corporation, and may create, administer, and/or otherwise use an account of the corporation.

In one or more embodiments of the invention, the messaging platform (100) is a system including hardware and software components providing a messaging service. The messaging platform (100) may include a software component or a series of communicatively connected software components for allowing messaging between users. Examples of a messaging platform may include, but are not limited to, a real-time messaging system, a microblogging site, a social networking platform, a publish-subscribe system, a location based service, and any other message passing service capable of passing messages between one or more users and/or accounts.

In one or more embodiments of the invention, a user of the platform composes a message to be broadcast from the client (150). The client (150) can be any computing device capable of composing and/or sending a message to the messaging platform (100). Examples of a client may include, but are not limited to, a mobile phone, a personal computer (laptop, desktop, or server), or a specialized appliance having communication capability. The client (150) can utilize any of a number of advantageous interfaces, including a web-based client, a Short Messaging Service (SMS) interface, an instant messaging interface, an email-based interface, an API function-based interface, and etc. The message can be transmitted through a communication network to the messaging platform (100).

In one or more embodiments of the invention, the routing module (105) includes functionality to receive one or more messages and to store the messages in the message repository (130). The routing module (105) may be configured to is assigned an identifier to the message and to notify the fanout module (106) of a sender of the message.

In one or more embodiments of the invention, the fanout module (106) includes functionality to retrieve graph data from the connection graph repository (131) and to using the graph data to determine which accounts in the messaging platform (100) should receive the message. The graph data, for example, can reflect which accounts in the messaging platform are "following" a particular account and are, therefore, subscribed to receive status messages from the particular account.

In one or more embodiments of the invention, the delivery module (107) includes functionality to receive a list of accounts from the fanout module (106) and the message identifier generated by the routing module (105) and to insert the message identifier into stream data associated with each identified account. The delivery module (107) may then store the message list in the stream repository (132). The stream data stored in the stream repository (132) can make up one or more streams associated with one or more accounts of the messaging platform (100). A stream may be a dynamic list of messages associated with one or more accounts or can reflect any arbitrary organization of messages that is advantageous for the user of an account.

In one or more embodiments of the invention, the frontend module (120) is a software application or a series of related software applications configured to communicate with external entities (e.g., client (150)). The frontend module (120) may include the application programming interface (API) (125) and/or any number of other components used for communicating with entities outside of the messaging platform (100). The API (125) may include any number of specifications for making requests from and/or providing data to the messaging platform (100). For example, a function provided by the API (125) may provide suggested accounts to a requesting client (150).

In one or more embodiments of the invention, the frontend module (120) is configured to use one or more of the data repositories (message repository (130), connection graph repository (131), stream repository (132), account repository (133)) to define streams for serving messages (i.e., stream data) to a user of the account on the messaging platform (100). A user can use any client (150) to receive the messages. For example, where the user uses a web-based client to access the messaging platform (100), the API (125) can be utilized to define one or more streams and/or to serve the stream data to the client for presentation to the user. Similarly, different forms of message delivery can be handled by different modules in the frontend module (120). In one or more embodiments of the invention, the user can specify particular receipt preferences which are implemented by the frontend module (120).

In one or more embodiments of the invention, the analytics engine (112) is a software application or a set of related software applications configured to execute on one or more hardware processors. The analytics engine (112) may be an application in a server of a data center and/or a cloud computing application in a network distributed system. One or more components of the analytics engine (112) may reside in a personal computing device (e.g., smartphone, laptop computer, desktop computer, etc.) of a user. In one or more embodiments of the invention, the analytics engine (112) is integrated within or operatively connected to one or more other components of the messaging platform (100).

In one or more embodiments of the invention, one or more of the data repositories (message repository (130), connection graph repository (131), stream repository (132), account repository (133), site statistics repository (134), suggestion repository (135)) is a database and/or storage service residing on one or more servers. For example, one or more of the data repositories may be implemented as a storage service using service-oriented architecture (SOA) and configured to receive requests for data and to provide requested data to other components of the messaging platform (100). In another example, the message repository (130) may include one or more tables in a distributed database management system (DBMS), a clustered database, a standalone flat file, and/or any storage software residing on one or more physical storage devices. Examples of a storage device may include, but are not limited to, a hard disk drive, a tape drive, a solid state drive, and/or other memory device. Any type of database or storage application can be used, in accordance with various embodiments of the invention.

In one or more embodiments of the invention, one or more of the data repositories (message repository (130), connection graph repository (131), stream repository (132), account repository (133), site statistics repository (134), suggestion repository (135)) is a separate application or series of applications residing on one or more servers external (and communicatively coupled) to the messaging platform (100). Alternatively, in one or more embodiments of the invention, one or more of the data repositories may be an integrated component of the messaging platform (100) and/or may reside, either partially or entirely, on one or more common hardware devices (e.g., a server).

Figure 3:
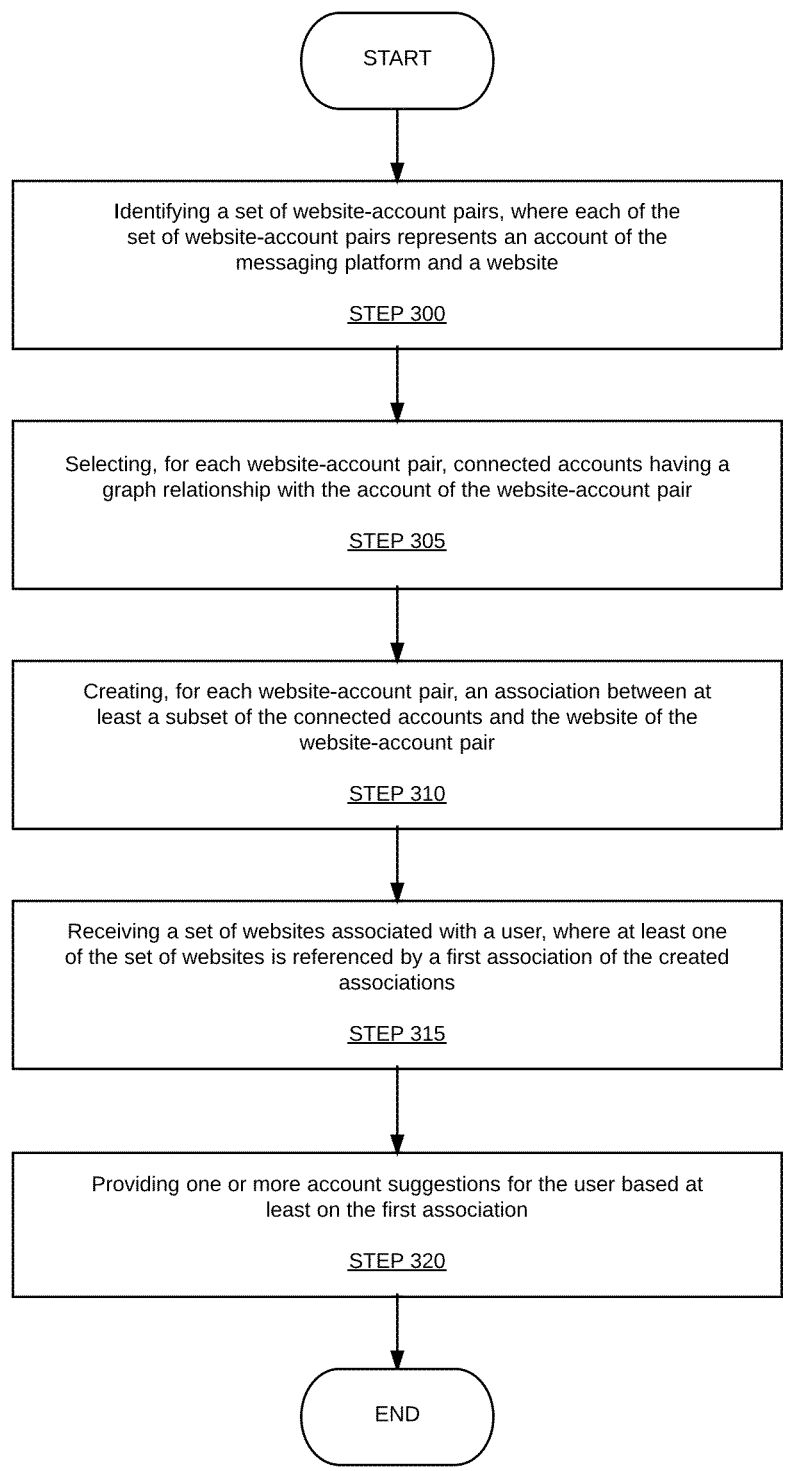
FIGS. 3-5 show flowcharts in accordance with one or more embodiments of the invention.

FIG. 3 shows a flowchart of a method for suggesting accounts for a user of a messaging platform. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, a set of website-account pairs is identified, where each pair represents an account of the messaging platform and a website. In one or more embodiments of the invention, the websites and the accounts are maintained in one or more predefined lists which are updated periodically and/or upon request. For example, a list of verified accounts may be generated based on one or more filtering criteria. In another example, a list of popular websites may be maintained based on usage data, traffic data, and/or one or more other criteria. The websites and accounts may then be used to generate the website-account pairs. Generation of the website-account pairs may occur on-demand (e.g., in response to STEP 315) and/or may be performed periodically by one or more background processes, in accordance with various embodiments of the invention. Thus, in one or more embodiments of the invention, STEPS 300-310 may be performed before or after STEP 315. Furthermore, in one embodiment, the set of website-account pairs may be generated concurrently with one or more of the subsequent steps (i.e., STEPS 310 and 315).

In STEP 305, for each website-account pair, one or more connected accounts having a graph relationship with the account of the website-account pair is selected.

In STEP 310, for each website-account pair, an association between at least a subset of the connected accounts and the website of the website-account pair is created.

In STEP 315, a set of websites associated with a user is identified, where at one or more of the set of websites is referenced by an association created in STEP 310. In one or more embodiments, the association is created after STEP 315. The websites may be identified over any period of time and/or obtained from any source (e.g., a client computing device (150) of FIG. 1, discussed above), in accordance with various embodiments of the invention.

In STEP 320, one or more account suggestions for the user is provided based at least on the association referencing the one or more websites. The account suggestions may be sent to the client computing device for display to the user or may be sent to any other requesting entity, in accordance with various embodiments of the invention.

Figure 4:
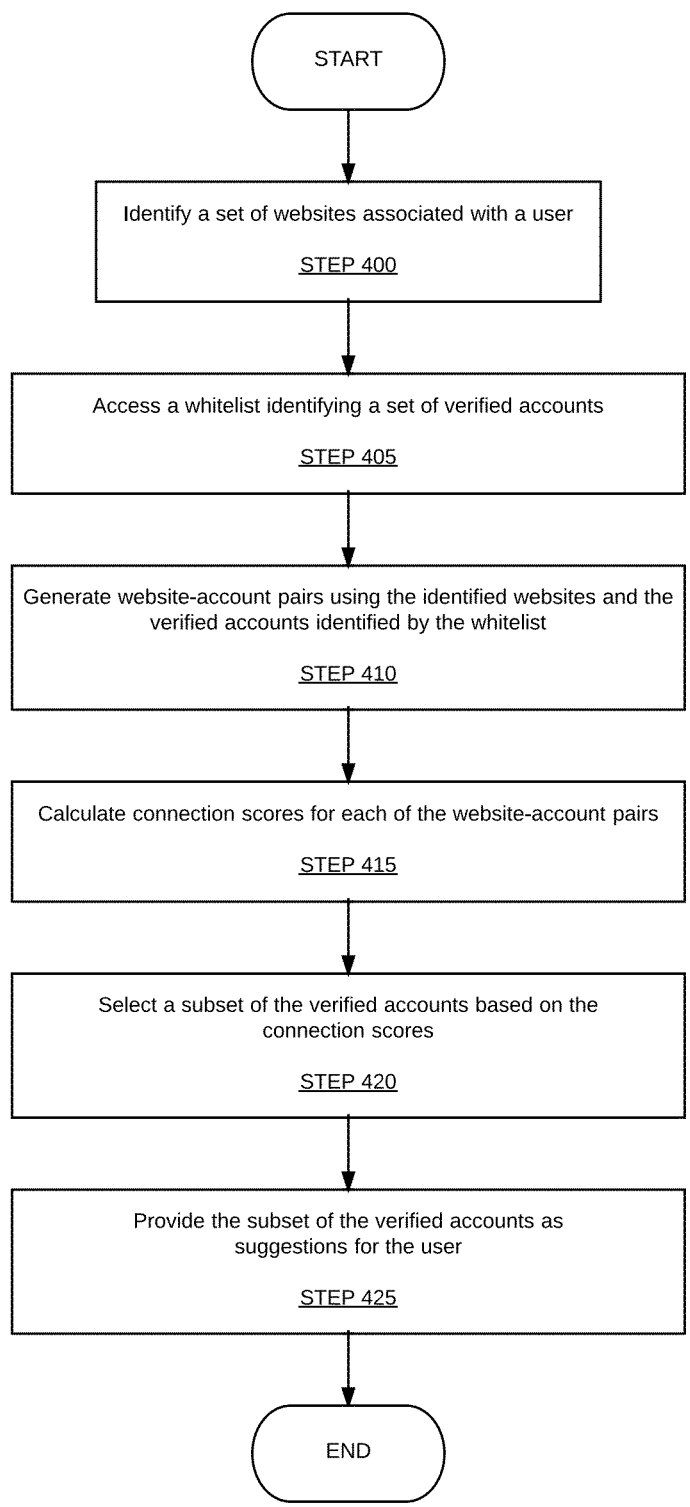

FIG. 4 shows another flowchart of a method for suggesting accounts for a user of a messaging platform. Similar to FIG. 3 (discussed above), while the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 4 should not be construed as limiting the scope of the invention.

In STEP 400, in one or more embodiments of the invention, a set of visited websites of a user is identified. As with the steps of FIG. 3 (discussed above), identifying the websites may occur before, during, or after the identification of website-account pairs (STEP 410) and/or any other steps in the process (e.g., STEPS 415 and 420). The websites may be identified over any period of time and/or obtained from any source (e.g., a client computing device (150) of FIG. 1, discussed above), in accordance with various embodiments of the invention.

In STEP 405, in one or more embodiments of the invention, a whitelist identifying a set of verified accounts is accessed. The whitelist may be aggregated based on one or more filtering criteria for verifying accounts for inclusion in the whitelist or may be obtained from an external source (e.g., an external software application). In one or more embodiments of the invention, manual revisions to the whitelist may also be made after importing/identifying/aggregating the verified account.

In STEP 410, in one or more embodiments of the invention, a set of website-account pairs is generated using the identified websites and the verified accounts. The elements of the set may be generated concurrently with one or more of the subsequent steps. Thus, in one or more embodiments of the invention, the STEPS 410 and 415 may be performed concurrently.

In STEP 415, in one or more embodiments of the invention, connection scores are calculated for each of the website-account pairs. The connection scores may be calculated by using a predefined mathematical formula including various required inputs (e.g., number of visits by followers of the verified account, context data, graph data, user attribute data, etc.), in accordance with various embodiments of the invention.

In STEP 420, in one or more embodiments of the invention, a subset of the verified accounts is selected based on the connection scores. For example, a predefined number of accounts with the highest connection scores may be selected.

In STEP 425, in one or more embodiments of the invention, the subset of the verified accounts is provided as suggestions for the user. The subset may be sent to the client computing device for display to the user or may be sent to any other requesting entity, in accordance with various embodiments of the invention.

Figure 5:
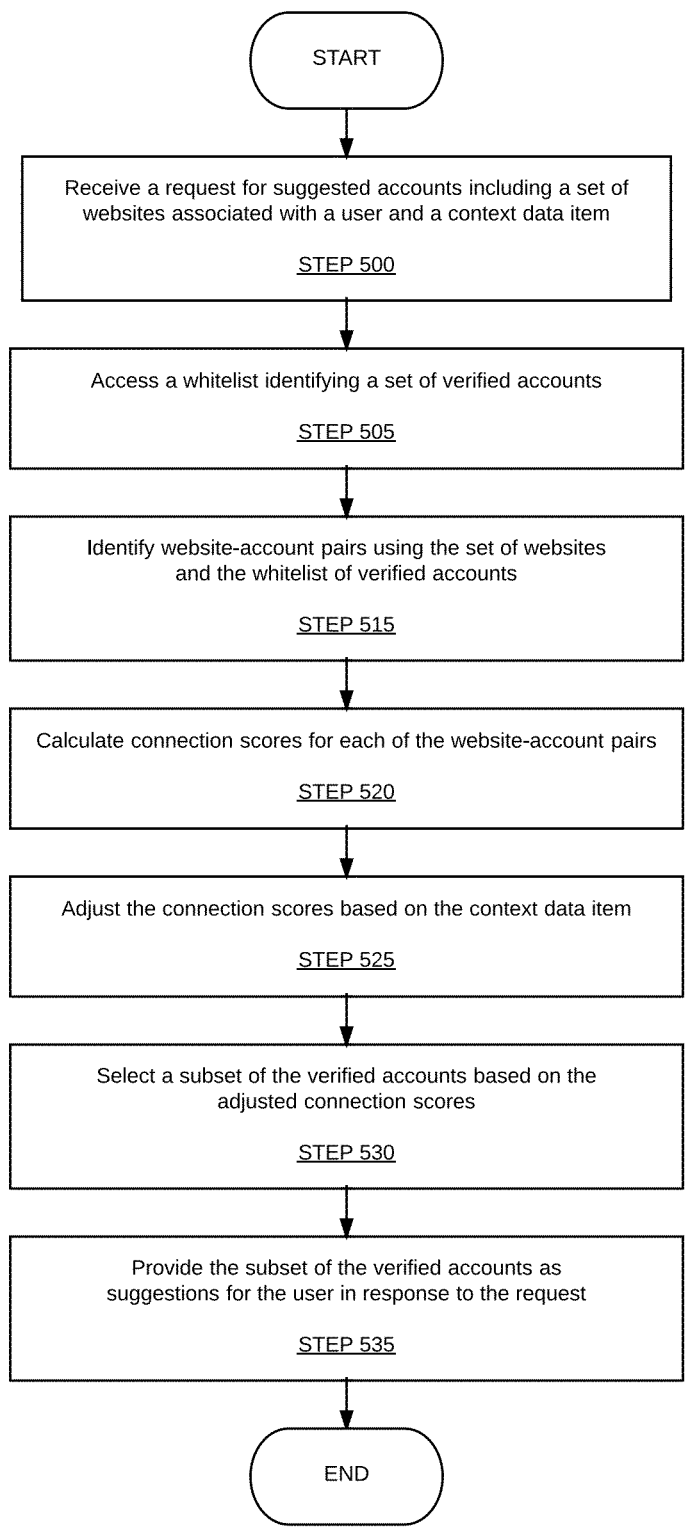

FIG. 5 shows yet another flowchart of a method for suggesting accounts for a user of a messaging platform. Similar to FIGS. 3 and 4 (discussed above), while the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 5 should not be construed as limiting the scope of the invention.

In STEP 500, in one or more embodiments of the invention, a request for suggested accounts including a set of visited websites of a user and a context data item is received. In STEP 505, in one or more embodiments of the invention, similar to STEP 405 of FIG. 4 (discussed above), a whitelist identifying a set of verified accounts is accessed. The context data item may be provided by a requesting entity and/or a client computing device of the user, in accordance with various embodiments of the invention. For example, the visited websites and the context data items may be arguments in an API call made by the client and may be received before, during, or after any one of the subsequent steps.

In STEP 515, in one or more embodiments of the invention, similar to STEP 410 of FIG. 4 (discussed above), a set of website-account pairs is generated using the set of websites and the whitelist of verified accounts. In STEP 520, in one or more embodiments of the invention, similar to STEP 400 of FIG. 4 (discussed above), connection scores are calculated for each of the website-account pairs.

In STEP 525, in one or more embodiments of the invention, the connection scores are adjusted based on the context data item. The connection scores may be adjusted according to any number of predefined rules associated with different types of context data. For example, the context data item may be a numerical value indicating a membership status of the user. Any number of modifications may be made to the connection scores, in accordance with various embodiments of the invention.

In STEP 530, in one or more embodiments of the invention, similar to STEP 420 of FIG. 4 (discussed above), a subset of the verified accounts is selected based on the adjusted connection scores. In STEP 535, in one or more embodiments of the invention, similar to STEP 425 of FIG. 4 (discussed above), the subset of the verified accounts is provided as suggestions for the user.

The following section describes various examples of the invention. The examples are included to aid in the understanding of the invention but are not intended to limit the scope of the invention.

FIG. 6A depicts an example of a set of visited universal resource locators (URLs) of a user, in accordance with one or more embodiments of the invention. In this example, a real-time messaging platform includes a suggestion generator which performs a set of queries against an account repository. The account repository stores millions of accounts of individuals, businesses, and other entities which send messages to other accounts both inside and outside of the real-time messaging platform. The platform allows users to communicate in "real-time", i.e., to converse with other accounts with a minimal delay and to conduct a conversation with another user during simultaneous sessions.

Continuing the example, a client software application makes an API call requesting suggested accounts. The request includes a list of visited website URLs and an integer context identifier. In this example, the context identifier parameter may be any one of the following: 1=mobile visitor, 2=mobile member, 3=third party visitor, 4=third party member, 5=native application visitor, and 6=native application member. The context identifier provided in the API call is a 1, indicating that the request is for a non-member using a mobile device. An integer parameter indicates the number of requested suggestions. In this example, the API call requests 20 suggested accounts. In order to maintain the user's privacy, no identifying information is provided in the request.

Continuing the example, a frontend module of the real-time messaging platform receives the request and passes it on to a suggestion service for processing. The suggestion service sends the request to a suggestion generator, which begins by tokenizing each URL in the list of visited URLs. The suggestion generator identifies a rule for truncating the URLs and proceeds to truncate the path portion of each URL after the first level. The resulting list of visited URLs is depicted by FIG. 6B. At this point in the example, the suggestion generator identifies and removes all duplicate URLs from the resulting list. The following URLs are determined to be duplicated: "http://www.forbes.com/sites/" (twice) and "http://sportsillustrated.cnn.com/2012/" (once). The suggestion generator records a number of duplications for each URL (in this case, two and one, respectively). FIG. 6C depicts the resulting list of URLs (with duplicates removed).

Continuing the example, the suggestion generator identifies a whitelist of verified accounts of the messaging platform. In this example, the whitelist is generated as follows. Initially, core accounts of the messaging platform are identified. The core accounts are accounts having at least 400 followers, at least 200 posted messages, and must be at least 1 year old. After identifying the core accounts, the suggestion generator proceeds to identify verified accounts for the whitelist using a second list of filtering criteria. The second list of filtering criteria are sorted according to a predefined order of importance. In this example, the suggestion generator applies the second list of filtering criteria sequentially until a result set of a maximum size of 15,000 is obtained (i.e., a threshold size is reached). Thus, initially, the suggestion generator applies a first filtering criteria to all core accounts. The first filtering criterion requires that the account have a minimum follower to followee ratio of 1.5. This produces a result set of 300,000 accounts. The suggestion generator determines that the threshold size is not yet reached and, as a result, applies the next filtering criterion in the sorted list. The next filtering criterion requires that the account have an average minimum number of monthly logins that is greater than 5. Applying the second filtering criterion reduces the size of the result set to 25,000. The suggestion generator determines that the threshold size is not yet achieved, and proceeds with applying a third filtering criterion from the sorted list. The third filtering criterion requires that the account be mentioned (within messages posted by other accounts) an average of at least 20 times per day during the past month. This third criterion reduces the size of the result set to 11,000 and the threshold size is reached.

Continuing the example, after determining that the threshold size is reached, the suggestion generator proceeds to identify accounts for suggestion from the whitelist of 11,000 accounts. The suggestion generator initially generates a set of 132,000 website-account pairs by pairing each of the 12 URLs with each of the 11,000 accounts. For each pair, the suggestion generator identifies a number of followers of the account which have visited the website. FIGS. 6D and 6E depict example tables representing the visitor counts for a two different verified accounts in the whitelist. Each row in the table represents a website-account pair, and shows a number of followers of the account which have visited the corresponding URL within the last 30 days.

Continuing the example, the suggestion generator then proceeds to calculate connection scores for each of the website-account pairs. In this example, the following formula is used to generate the connection scores:

$$\text{ConnectionScore}(URL, R_{ID}) = |URL_{visitors} \cap R_{IDfollowers}|,$$

where R is the set of verified accounts from the whitelist, $(URL, R_{ID})$ is the website-account pair, $URL_{visitors}$ is the set of all visitors to the website, and $R_{IDfollowers}$ is the set of connections of the verified account. After calculating each connection score, the suggestion generator proceeds to modify the connection score based on the context identifier. In this example, a numerical recognition score is calculated for each of the whitelisted accounts. In this example, the numerical recognition score of an account is simply the average number of monthly mentions of the account by other accounts. For purposes of this example, a mention is any identification of an account in a posted message of another account. Each account is given a minimum numerical recognition score of 1.

Continuing the example, each calculated connection score is multiplied by the numerical recognition score of the account. This produces a set of adjusted connection scores which are positively weighted by the numerical recognition scores. At this point the suggestion generator identifies the website-account pairs corresponding to the two URLs which were marked as being duplicated (see FIG. 6B). The adjusted connection scores for these pairs are adjusted once again by multiplying the scores by a predefined duplication factor for each duplication. Thus, in this example, given a duplication factor of 1.2, the website-account pairs including the URL "http://www.forbes.com/sites/" are multiplied by 1.4 (i.e., 1.2*2, due to a double duplication) and the website-account pairs including the URL "http://sportsillustrated.cnn.com/2012/" are multiplied by 1.2.

At this point, the suggestion generator proceeds to select the accounts with the top 20 connection scores. In order to reduce the number of suggestions associated with a single URL, the suggestion generator includes a maximum of 4 suggestions associated with a single URL in the final set of suggested accounts. Thus, in this case, if 6 of the top twenty connection scores correspond to the same URL, only the top four are included in the final 20 suggestions. While this may require ignoring some of the highest ranking connection scores, the final list of suggested accounts is less likely to be monopolized by a single URL using this technique. In this manner, 20 unique accounts are selected by the suggestion generator and provided to the client, via the suggestion service and then the frontend module, in response to the API call.

Figure 7:
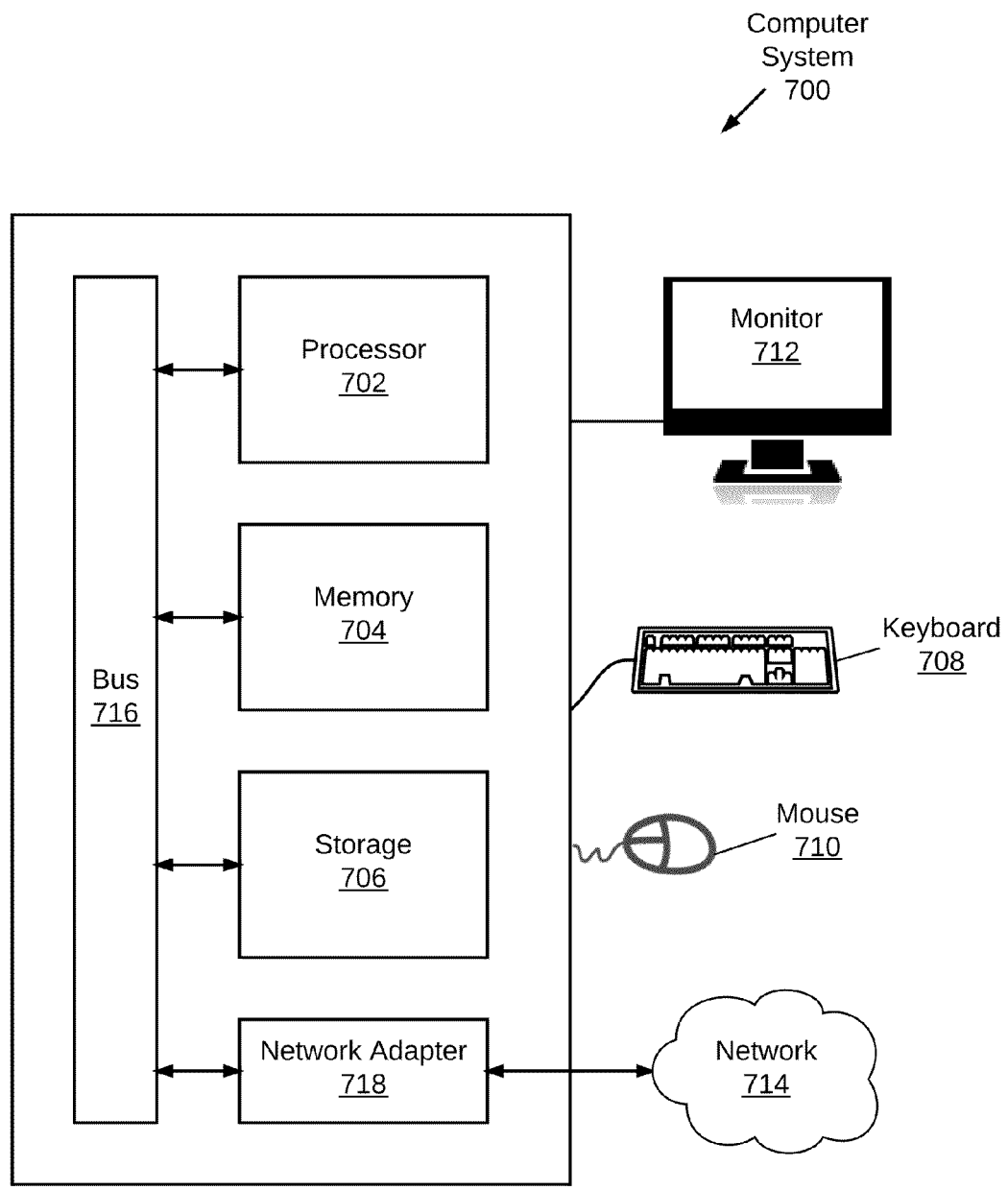
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) (such as a central processing unit (CPU), integrated circuit, hardware processor, etc.), associated memory (704) (e.g., RAM, cache memory, flash memory, etc.), a storage device (706) (e.g., a hard disk, an optical drive such as a compact disk drive or digital video disk (DVD) drive, a flash memory stick, etc.), a network adapter (718), and numerous other elements and functionalities typical of today's computers (not shown). One or more components of the computer system (700) may be communicatively connected by a bus (716). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via the network adapter (718). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g., frontend module (120), suggestion engine (110), suggestion generator (111), analytics engine (112), suggestion service (113), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By providing relevant suggestions to a user of a messaging platform, it may be possible to increase user engagement. Users may benefit from reduced time spent searching and a range of previously unknown yet relevant content. Other entities may also benefit. For example, advertisers may be able to increase engagement with relevant ads, and third party software applications may be able to provide more meaningful integration with the messaging platform.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing suggestions from a messaging platform, comprising:
   identifying, by a computer processor, a plurality of website-account pairs, wherein each of the plurality of website-account pairs represents an account of the messaging platform and a website;
   for each website-account pair of the plurality of website-account pairs:
      selecting, by the computer processor, connected accounts having a graph relationship with the account of the website-account pair, and
      creating an association between at least a subset of the connected accounts and the website of the website-account pair;
   receiving a set of websites associated with a user, wherein at least one of the set of websites is referenced by a first association of the created associations; and
   providing, by the computer processor, one or more account suggestions for the user based at least on the first association.

2. The method of claim 1, further comprising:
   accessing a whitelist identifying a plurality of verified accounts of the messaging platform, wherein the plurality of website-account pairs are generated using the plurality of verified accounts.

3. The method of claim 2, wherein the associations represent a number of the subset of connected accounts associated with visits to the website of the website-account pair, and wherein the method further comprises:

calculating, for each of the plurality of website-account pairs, a connection score based on the number, wherein providing the account suggestions is based on the calculated connection scores.

4. The method of claim 3, further comprising:
identifying a numerical recognition score for each of the plurality of verified accounts, wherein calculating the connection scores is further based on the numerical recognition scores.

5. The method of claim 4, further comprising:
receiving a context data item indicating that the user is not a member of the messaging platform; and
positively weighting the connection scores by the numerical recognition scores based on the context data item.

6. The method of claim 3, wherein each connection score is normalized using $$\frac{1}{\sum_{r \in R} |URL_{visitors} \cap r_{followers}|},$$

wherein R is the plurality of verified accounts, wherein $URL_{visitors}$ is a set of accounts associated with at least one visit to the website, and wherein $r_{followers}$ is a plurality of followers of account r.

7. The method of claim 3, wherein each of the plurality of verified accounts has a number of core followers exceeding a predefined minimum, and wherein each of the plurality of verified accounts has a number of followees less than a predefined maximum.

8. The method of claim 3, wherein providing the account suggestions comprises;
sorting the connection scores in decreasing order to create a sorted list; and
identifying, from the sorted list, a predefined number of accounts having the highest connection scores.

9. The method of claim 3, wherein providing the account suggestions comprises;
sorting the connection scores in decreasing order to create a sorted list;
selecting, from the sorted list, a top set of connection scores for each website of the set of websites to create a balanced sorted list; and
identifying a predefined number of accounts in the balanced sorted list having the highest connection scores.

10. The method of claim 1, wherein the associations represent one selected from a group consisting of a number of visits to the website associated with the subset of the connected accounts, a demographic profile of the website matched to the subset of the connected accounts, a business category of the website matched to the subset of the connected accounts, and a descriptive keyword of the website matched to the subset of the connected accounts.

11. A system for providing suggestions from a messaging platform, comprising:
a computer processor;
a data repository storing a plurality of website-account pairs, wherein each of the plurality of website-account pairs represents an account of the messaging platform and a website; and
a suggestion engine executing on the processor and configured to:
access the plurality of website-account pairs;
for each website-account pair of the plurality of website-account pairs:
select connected accounts having a graph relationship with the account of the website-account pair, and
create an association between at least a subset of the connected accounts and the website of the website-account pair;
receive a set of websites associated with a user, wherein at least one of the set of websites is referenced by a first association of the created associations; and
provide one or more account suggestions for the user based at least on the first association.

12. The system of claim 11, wherein the suggestion engine is further configured to:
access a whitelist identifying a plurality of verified accounts of the messaging platform, wherein the plurality of website-account pairs are generated using the plurality of verified accounts.

13. The system of claim 12, wherein the associations represent a number of the subset of connected accounts associated with visits to the website of the website-account pair, and wherein the suggestion engine is further configured to:
calculate, for each of the plurality of website-account pairs, a connection score based on the number, wherein providing the account suggestions is based on the calculated connection scores.

14. The system of claim 13, wherein the suggestion engine is further configured to:
identify a numerical recognition score for each of the plurality of verified accounts;
identify a context data item indicating that the user is a member of the messaging platform; and
negatively weight the connection scores by the numerical recognition scores based on the context data item.

15. The system of claim 13, wherein each of the plurality of verified accounts has a number of core followers exceeding a predefined minimum, and wherein each of the plurality of verified accounts has a number of followees less than a predefined maximum.

16. The system of claim 13, wherein selecting the subset of the connected accounts comprises;
sorting the connection scores in decreasing order to create a sorted list;
selecting, from the sorted list, a top set of connection scores for each website of the set of websites to create a balanced sorted list; and
identifying a predefined number of accounts in the balanced sorted list having the highest connection scores.

17. The system of claim 11, wherein the data repository resides on a client computing device of the user.

18. A non-transitory computer readable storage medium comprising instructions for providing suggestions from a messaging platform, the instructions, when executed by a computer processor, comprising functionality to:
identify a plurality of website-account pairs, wherein each of the plurality of website-account pairs represents an account of the messaging platform and a website;
for each website-account pair of the plurality of website-account pairs:
select connected accounts having a graph relationship with the account of the website-account pair, and
create an association between at least a subset of the connected accounts and the website of the website-account pair;
receive a set of websites associated with a user, wherein at least one of the set of websites is referenced by a first association of the created associations; and
provide one or more account suggestions for the user based at least on the first association.

19. The non-transitory computer readable storage medium of claim 18, the instructions further comprising functionality to:
   access a whitelist identifying a plurality of verified accounts of the messaging platform, wherein the plurality of website-account pairs are generated using the plurality of verified accounts.

20. The non-transitory computer readable storage medium of claim 19, wherein the associations represent a number of the subset of connected accounts associated with visits to the website of the website-account pair, and wherein the instructions further comprise functionality to:
   calculate, for each of the plurality of website-account pairs, a connection score based on the number, wherein providing the account suggestions is based on the calculated connection scores.

21. The non-transitory computer readable storage medium of claim 20, wherein providing the account suggestions comprises;
   sorting the connection scores in decreasing order to create a sorted list; and
   identifying, from the sorted list, a predefined number of accounts having the highest connection scores.

* * * * *